Figure 1:
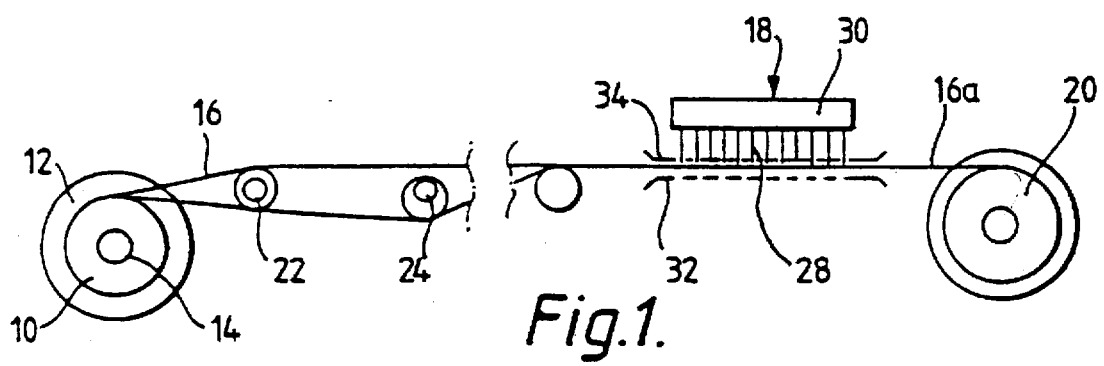

United States Patent [19]

Lawton et al.

[11] Patent Number: 5,737,821
[45] Date of Patent: *Apr. 14, 1998

[54] PRODUCTION OF SHAPED FILAMENTARY STRUCTURES

[75] Inventors: Peter Geoffrey Lawton, Halifax; Norman Smith, Rugby, both of England

[73] Assignee: Aerospace Preforms Limited, West Yorkshire, England

[*] Notice: The term of this patent shall not extend beyond the expiration date of Pat. No. 5,081,754.

[21] Appl. No.: 671,009

[22] Filed: Jun. 28, 1996

Related U.S. Application Data

[63] Continuation of Ser. No. 417,454, Apr. 5, 1995, which is a continuation of Ser. No. 184,594, Jan. 21, 1994, abandoned, which is a division of Ser. No. 805,375, Dec. 10, 1991, Pat. No. 5,323,523, which is a continuation of Ser. No. 576,678, Aug. 31, 1990, Pat. No. 5,081,754, which is a division of Ser. No. 6,899, Jan. 27, 1987, Pat. No. 4,955,123.

[51] Int. Cl.⁶ ..................................................... B23P 17/00
[52] U.S. Cl. .......................... 29/419.1; 28/107; 28/114; 28/115; 29/411; 29/412; 29/521
[58] Field of Search ........................ 29/419.1, 411, 29/412, 521; 28/107, 114, 115

[56] References Cited

U.S. PATENT DOCUMENTS

| | | | |
|---|---|---|---|
| 2,132,530 | 10/1938 | Greiser | 28/4 |
| 2,314,162 | 3/1943 | Reinhardt | 117/65 |
| 2,930,100 | 3/1960 | Rust | 28/4 |
| 3,010,178 | 11/1961 | Rust | 28/4 |
| 3,090,101 | 5/1963 | Chagnon et al. | 28/72.2 |
| 3,250,493 | 5/1966 | Burkley et al. | 242/158 |
| 3,391,436 | 7/1968 | Fehrer | 28/4 |
| 3,508,307 | 4/1970 | Dilo | 38/4 |
| 3,540,096 | 11/1970 | Porta | 28/4 |
| 3,555,638 | 1/1971 | O'Byrne | 28/4 |
| 3,657,061 | 4/1972 | Carlson et al. | 161/81 |
| 3,673,024 | 6/1972 | Eriksson | 156/137 |
| 3,730,320 | 5/1973 | Freeder et al. | 192/107 M |
| 3,772,115 | 11/1973 | Carlson et al. | 156/148 |
| 3,909,891 | 10/1975 | Dilo | 28/4 |
| 3,909,893 | 10/1975 | Wilde | 28/72.2 |
| 3,936,552 | 2/1976 | Krupp et al. | 428/64 |
| 3,971,669 | 7/1976 | Wrzesien et al. | 156/181 |
| 3,994,762 | 11/1976 | Wrzesien et al. | 156/148 |
| 4,085,486 | 4/1978 | Dilo | 28/110 |
| 4,097,983 | 7/1978 | Cole | 29/521 |
| 4,284,680 | 8/1981 | Awano et al. | 428/234 |
| 4,490,201 | 12/1984 | Leeds | 156/155 |
| 4,621,662 | 11/1986 | Olry | 138/129 |
| 4,790,052 | 12/1988 | Olry | 28/114 X |

FOREIGN PATENT DOCUMENTS

| | | |
|---|---|---|
| 026690 | 10/1980 | European Pat. Off. . |
| 148539 | 6/1984 | European Pat. Off. . |
| 147 297 | 7/1985 | European Pat. Off. . |
| 0232059 | 8/1987 | European Pat. Off. . |

(List continued on next page.)

*Primary Examiner*—Richard Weisberger
*Attorney, Agent, or Firm*—Adams Law Firm, P.A.

[57] ABSTRACT

A method of producing a shaped fibrous fabric structure is similar to that described in the parent application, in that a continuous filament sheet is subjected to a needle punching action, segments are cut from the sheet and these segments are assembled to form an annulus, and then subjected to rotary motion under a reciprocating needling head and continuing to add segments to build up a stack of layers while at the same time continuing the needling action, and lowering the base of the stack relatively to the needling head. However, in a final step, one or more layers of segments are added to the top of the stack, and these are needled into the stack without lowering the stack. Furthermore, these additional layers are preferably made entirely of stapled fibers. Some or all of the layers of segments below the final layers may themselves be made of duplex material comprising continuous filament on which is laid a web of stapled fibers before the duplex material is produced by needling the stapled web to the continuous filaments.

7 Claims, 8 Drawing Sheets

FOREIGN PATENT DOCUMENTS

| | | |
|---|---|---|
| 530 741 A1 | 9/1992 | European Pat. Off. . |
| 2378888 | 5/1977 | France . |
| 2414574 | 1/1979 | France . |
| 2506672 | 6/1981 | France . |
| 2 506 672 | 12/1982 | France . |
| 8801993 | 1/1988 | France . |
| 1570992 | 6/1988 | France . |
| 1660786 | 3/1966 | Germany . |
| 2324985 | 5/1973 | Germany . |
| 2434242 | 7/1974 | Germany . |
| 2911762 | 3/1979 | Germany . |
| 725425 | 3/1955 | United Kingdom . |
| 931611 | 5/1961 | United Kingdom . |
| 1111199 | 4/1968 | United Kingdom . |
| 1111200 | 4/1968 | United Kingdom . |
| 1308999 | 9/1970 | United Kingdom . |
| 1380518 | 9/1973 | United Kingdom . |
| 1447029 | 8/1976 | United Kingdom . |
| 1447030 | 8/1976 | United Kingdom . |
| 2 012 171 | 7/1979 | United Kingdom . |
| 1549687 | 8/1979 | United Kingdom . |
| 2012671 | 6/1982 | United Kingdom . |
| 2159460 | 5/1985 | United Kingdom . |
| 2177431 | 6/1986 | United Kingdom . |
| 2177345 | 1/1987 | United Kingdom . |
| 2230491 | 5/1990 | United Kingdom . |

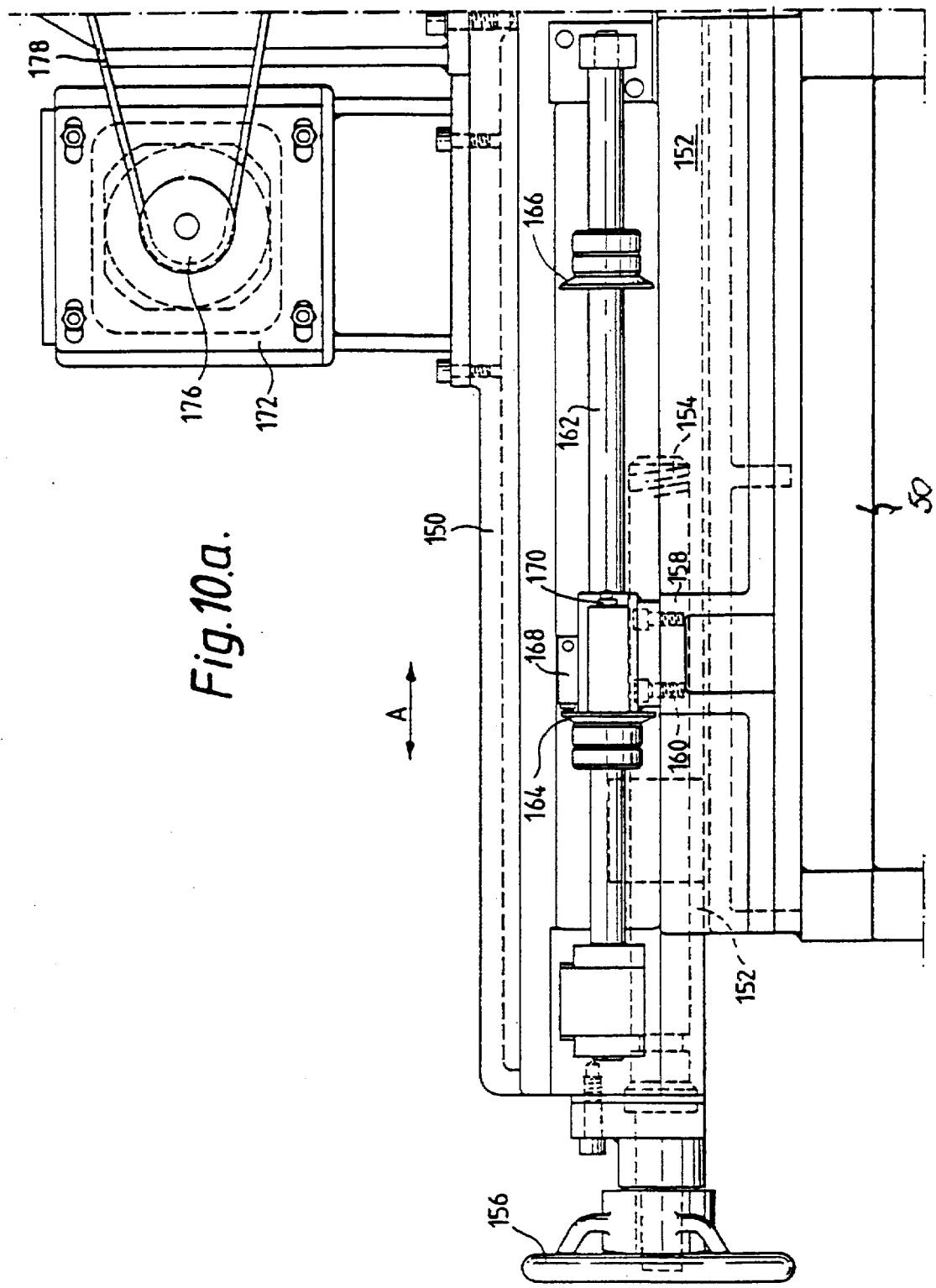

PRODUCTION OF SHAPED FILAMENTARY STRUCTURES

This application is a continuation application of U.S. Ser. No. 08/417,454 filed Apr. 5, 1995, pending, which is a continuation application of U.S. Ser. No. 08/184,594 filed Jan. 21, 1994, now abandoned, which is a divisional application of U.S. Ser. No. 07/805,375 filed Dec. 10, 1991 now U.S. Pat. No. 5,323,523, which is a continuation of U.S. Ser. No. 07/576,678 filed Aug. 31, 1990 now U.S. Pat. No. 5,081,757, which is division of U.S. Ser. No. 06/006,899 filed Jan. 27, 1987, now U.S. Pat. No. 4,955,823.

The invention relates to a method and apparatus for the production of a shaped filamentary structure and to filamentary structures made by the method and/or made on the apparatus. A particular application of the invention is in the manufacture of a carbonisable assembly and even more particularly to the manufacture of circular or annular shaped filamentary assemblies. It is to be understood however that in its broadest aspects, the invention is not restricted to any particular type of filamentary material nor to any particular shape of product. The expression "shaped structure" is however intended to exclude the production of mere piece goods.

In the specification of United States patent application Ser. No. 006 899 (Lawton et al) from which this application is a continuation-in-part, there is described a method of producing a shaped filamentary structure comprising the steps of: subjecting uni-directional layers of filaments to a needle punching action to give a degree of dimensional stability to the layer adequate to allow severing and manipulation of the layer; cutting a plurality of segments from the layer; assembling at least two of the segments in side-by-side contiguous relationship to produce a first filamentary layer of the required structural shape; superimposing at least one of similarly formed filamentary layers on the first layer and needle punching the assembled layers to produce cross-linking of the layers by filaments displaced out of the layers and extending in a direction generally perpendicular to the faces of the layers.

The specific embodiments described in that specification relate to the manufacture of annular preforms made for example from tows of polyacrylonitrile continuous filaments. In a first stage, a sheet of stretched filaments is first submitted to a needle punching process by passing the sheet of filaments through a conventional needle loom, to give the sheet a certain amount of cohesion. Segmental shapes, each corresponding to a segment of the finished annulus, are cut from the needled sheet and these segments are, in a second stage, assembled to form superimposed layers, each comprising an annulus made up of a series of the cut segments, and whilst the thickness of the stack of layers is being built up, the stack is rotated under a segmental needling head, so that the stack is subjected to a further needling process, but the distance between the bottom of the stack and the needling head is progressively increased, so that the degree of needling is substantially constant throughout the process.

It has been noted that the process described in the specific examples of Ser. No. 006 899 tends to produce preforms of low density. This is essentially because the needles have to break some of the continuous filaments before they can be carried downwards by the needles in the two needling stages. Also, some fibres carried downwards on one stroke may be retracted by a subsequent stroke if the needle engages with the same filament in a different position. For some applications of the preform, it is desirable to obtain a greater fibre density than appears to be possible if the segments are made entirely of continuous filaments.

It is also necessary for some purposes (e.g. when the preforms are used in the manufacture of brakes where the carbon-carbon product made from the preform has to withstand high stresses) to ensure that there is a good resistance to inter laminar weaknesses, some of which appear near to the top surface of the finished preform. Whilst no completely satisfactory theory can be offered, any inter laminar weaknesses may be due to the annular needling technique.

The present invention provides a method of producing shaped filamentary structures which improves on the specific methods described in Ser. No. 066 899.

According to this invention a method of manufacturing a shaped fibrous fabric structure from multiple layers of fibrous material comprises the steps of: providing a stack of layers of fibrous material one layer on top of another; needling the layers during the build up of the stack and increasing the distance between the bottom of the stack and the bottom of the needle stroke as the stack is being built up, and continuing the needling during a final needling step after the final layer of material is added to the stack without varying the distance between the bottom of the stack and the bottom of the needle stroke.

Preferably, at least the top layers of fibrous material comprise stapled fibres loosely held together. It is further preferred that at least one of said layers comprises both continuous filaments and stapled fibres needled together.

It has been found that this method improves resistance to inter laminar failure of the finished carbon-carbon product, particularly when the top layer (s) comprises stapled fibrous material. Moreover, especially when one or more of the layers includes stabled fibres as well as continuous filament, a better fibre density and cross layer bonding is obtained.

It will be appreciated that the steps used in carrying out the invention are similar to the steps described in Ser. No. 006 899 and the apparatus may be substantially identical.

Figure 3:
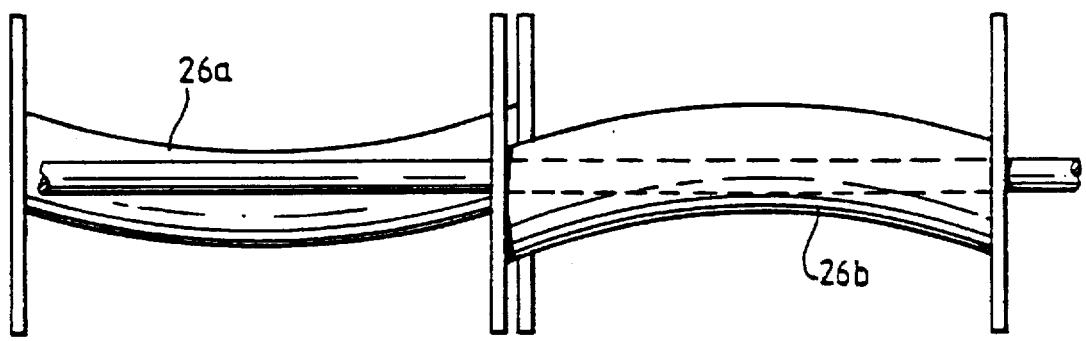
Figure 2:
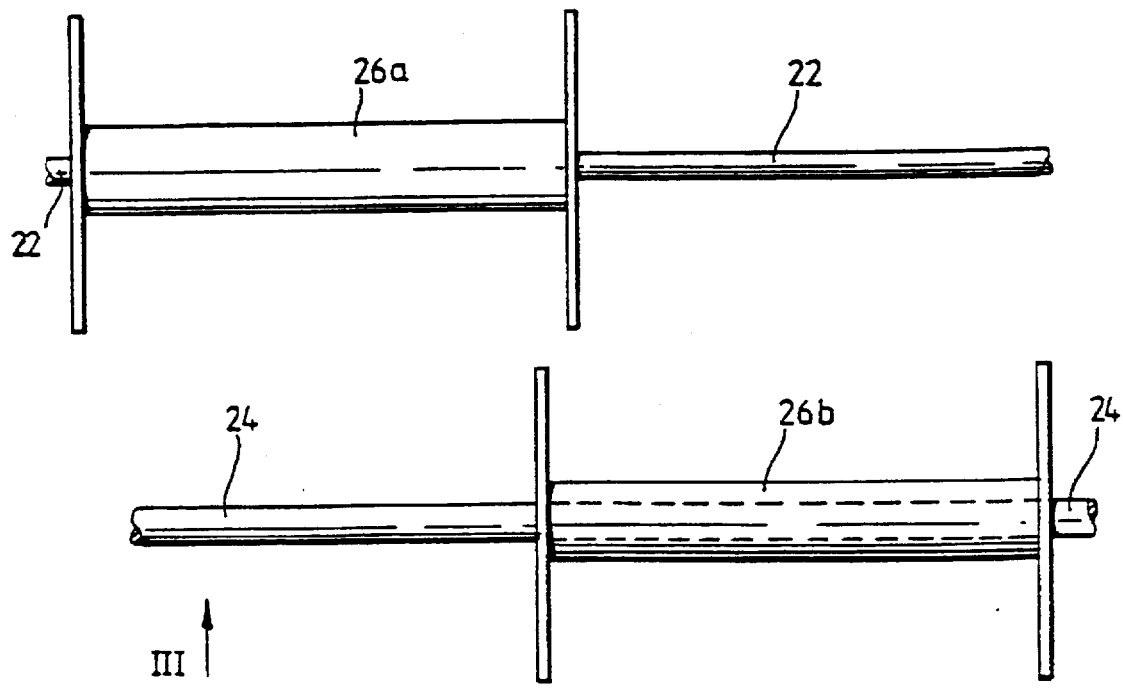
Figure 4:
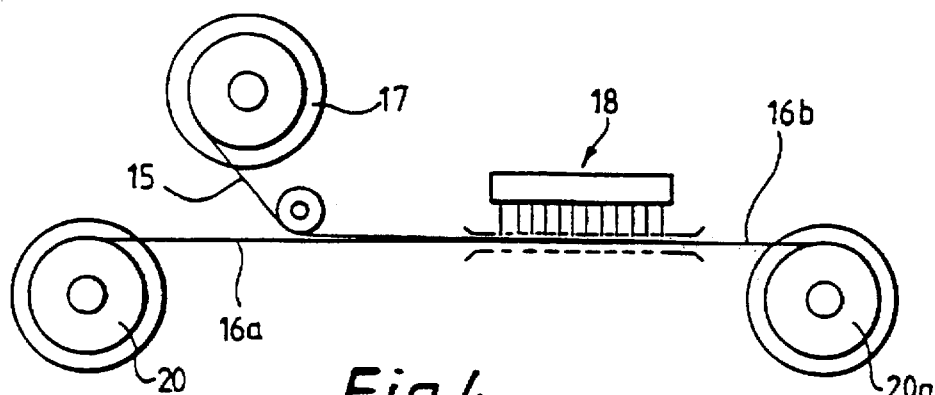
Figure 5:
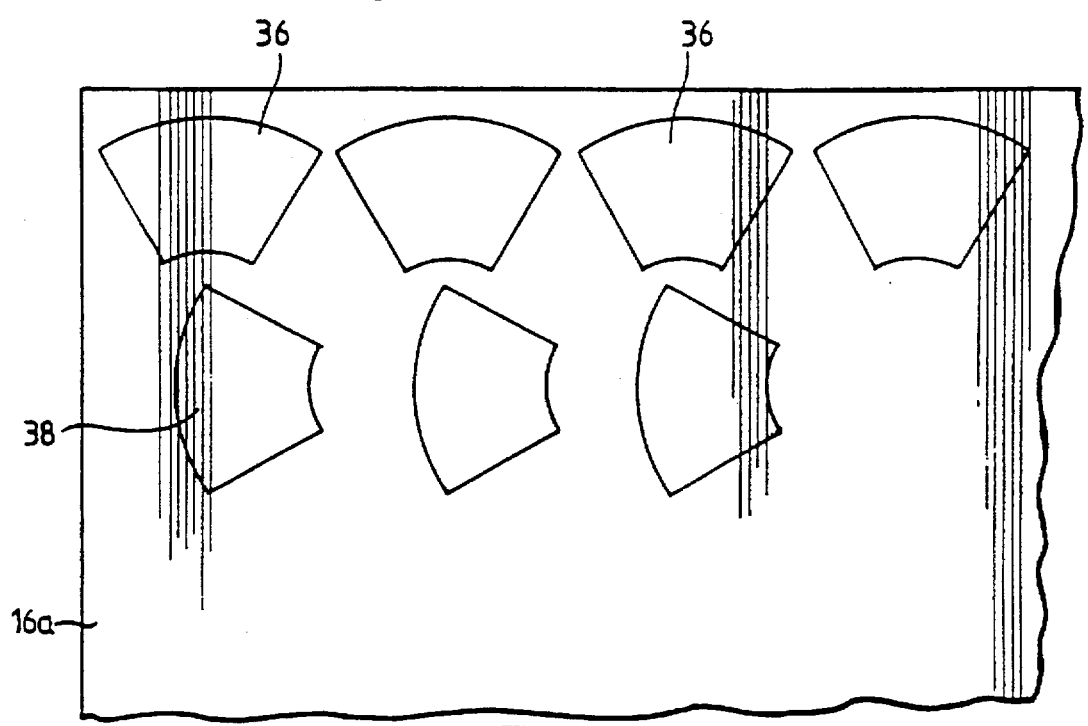
Figure 6:
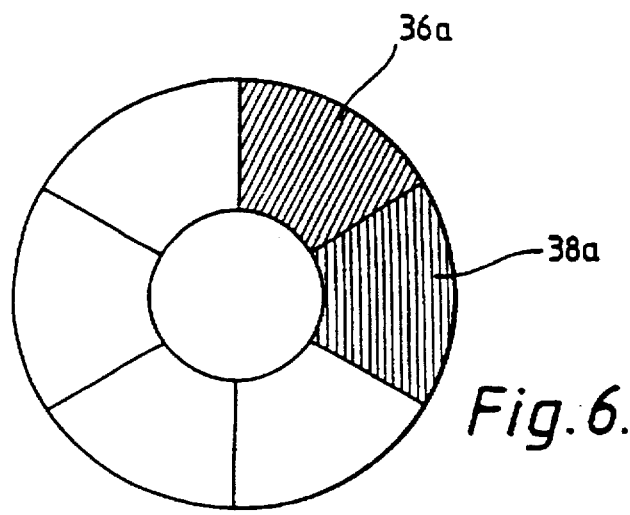
Figure 7:
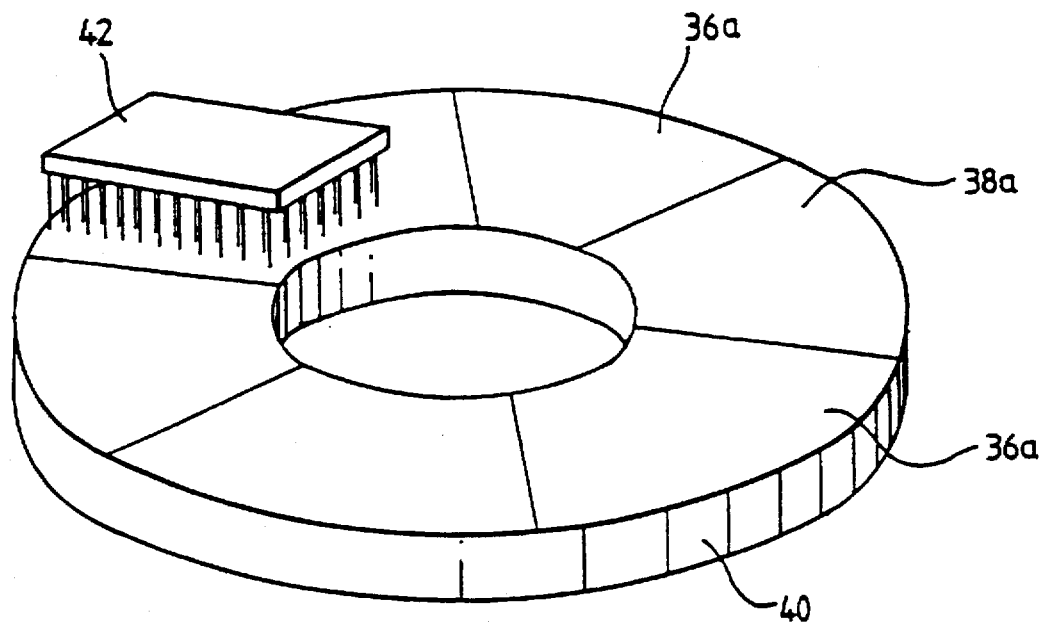
Figure 8:
Figure 9:
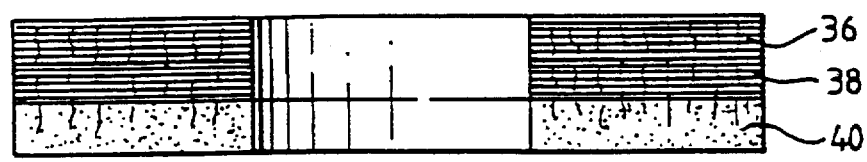
Figure 10B:
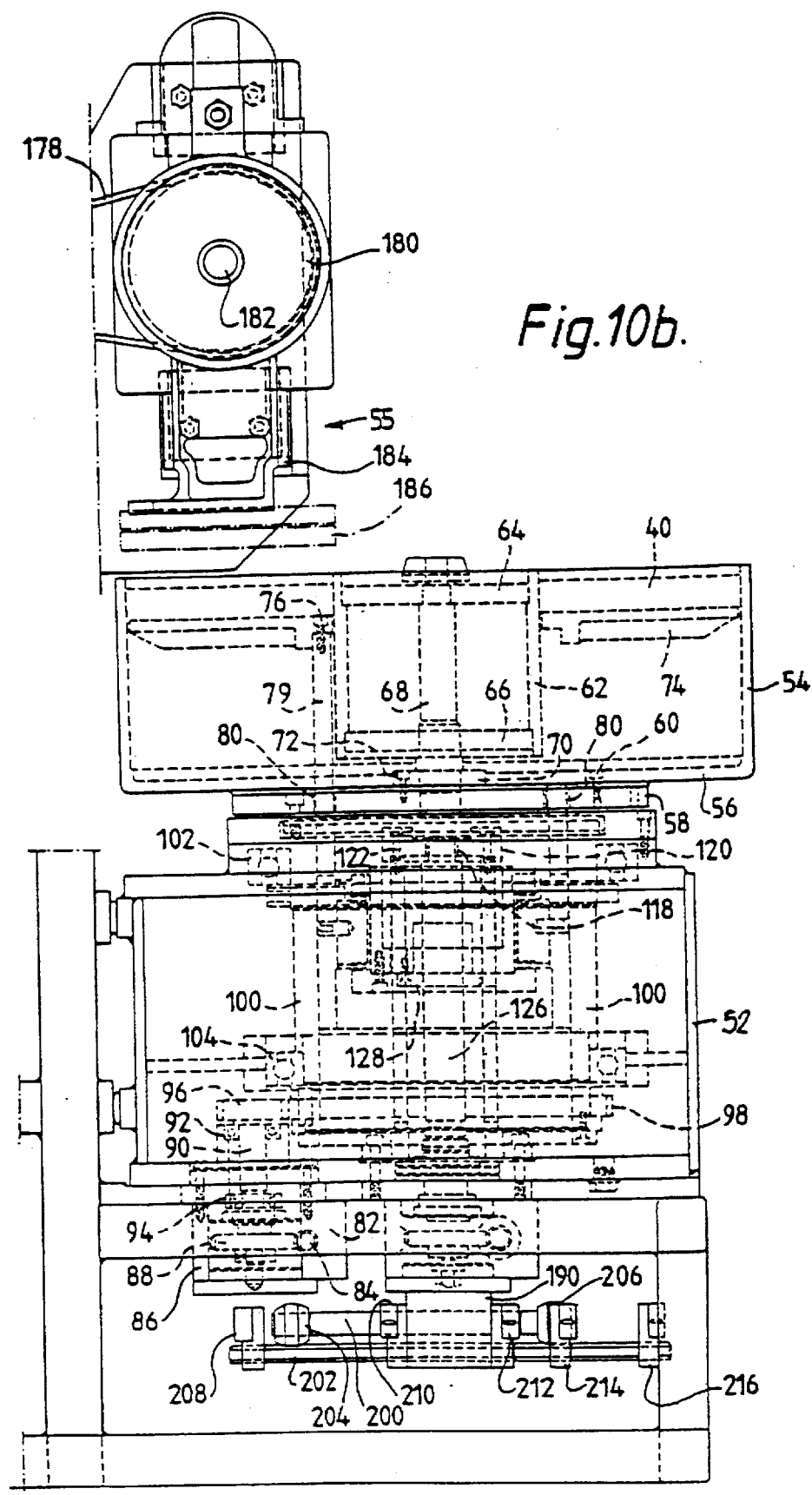
Figure 11:
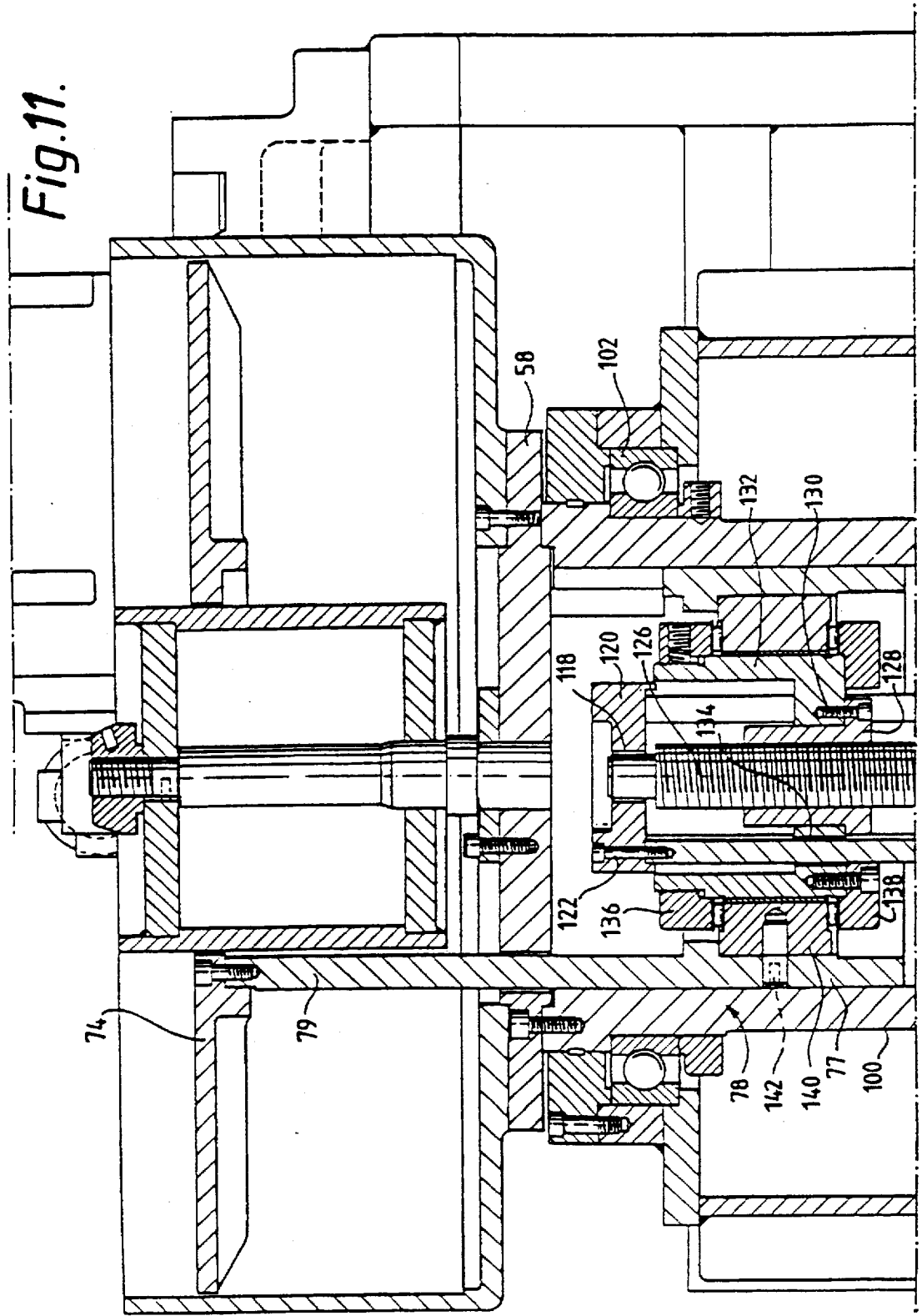
Figure 12:
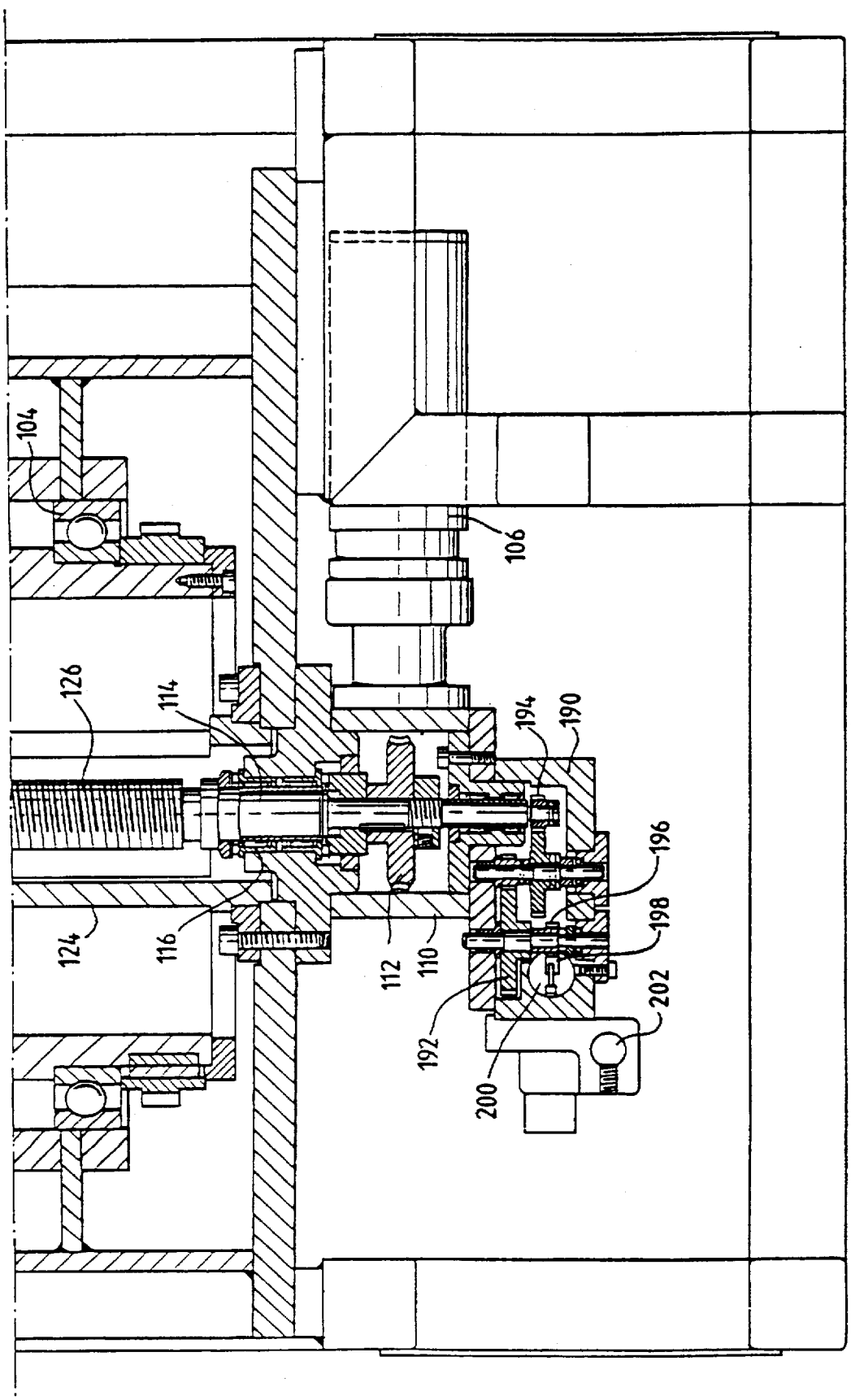
Figure 13:
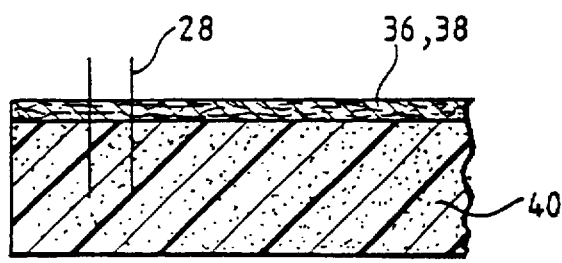
Figure 14:
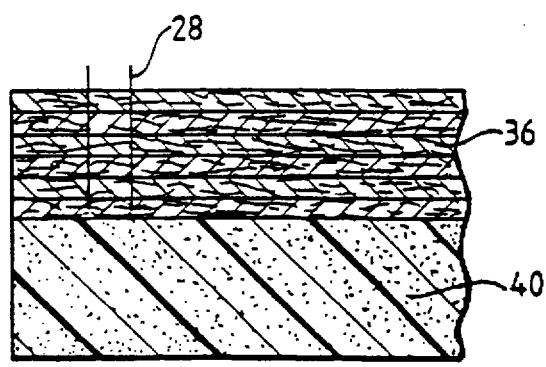
Figure 15:
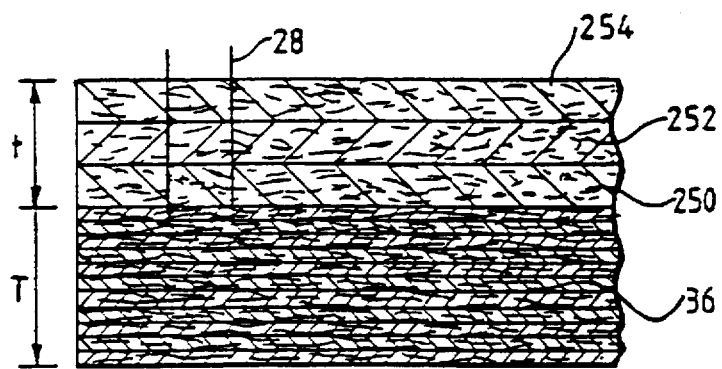

A method of manufacturing a carbonisable filamentary assembly for use as a preform, and apparatus for use in carrying out the manufacturing method will now be described by way of examples of the various aspects of the invention. In the accompanying drawings:

FIG. 1 is a diagram illustrating a first needle punching stage of the method;

FIG. 2 is a plan view of part of apparatus for presenting a sheet of filamentary material to a needle loom, FIG. 3 is an elevation looking in the direction of the arrow III in FIG. 2, FIG. 4 is a diagram illustrating a second needle punching stage of the method, FIG. 5 is a plan view of a sheet of filamentary material showing the cutting of segments from the sheet, FIG. 6 is a plan view of an assembly of segments to form an annular layer of sheet material;

FIG. 7 illustrates diagrammatically the method of needle punching an assembly of segments, FIG. 8 shows a first stage in an assembly needling operation, FIG. 9 is a cross-section through the assembly at the end of the needling operation, FIG. 10 is a general elevation of an annular needle punching machine, FIG. 11 is a detail view to a larger scale partly in section, showing a rotatable receptacle and associated parts used in the machine shown in FIG. 10, FIG. 12 is a detail view to the same scale as FIG. 10, of the driving mechanism for the apparatus shown in FIG. 10, FIG. 13 is a cross-section through a polyethylene support and a first fibrous layer at the commencement of a third needling stage;

FIG. 14 is a cross-section similar to FIG. 12 but showing the situation after six layers of fibrous layers have been laid, and FIG. 15 is a cross-section similar to FIG. 13, but showing the addition of the final layer of fibrous material.

The specific example relates to the manufacture of a "preform" made of oxydised polyacrylonitrile filaments. Such a preform may be carbonised, impregnated with a resin and then baked at very high temperature, so that both the fibrous filaments and the resin are changed to a carbonaceous form, whereby there is produced a shaped article made of carbon reinforced with carbon fibres. The technique of converting polyacrylonitrile fibres to carbon fibres by heat treatment is well known as are the techniques for production of carbon-carbon products and hence it is not necessary to describe these techniques in detail.

The polyacrylonitrile material is rendered suitable for carbonising by at least partial oxidation effected by passing the material through a furnace containing an oxidising atmosphere. It emerges from the oxidation process in the form of a continuous single filament textile fibre, that is to say, it is flexible and capable of being woven. However, the filamentary material has a highly polished surface sheen and is consequently quite difficult to handle.

For use in the process of the invention, the material is obtained in tow form and in a specific example, each tow is constituted by some 320,000 continuous filaments. It is necessary to assemble the filaments in the form of a unidirectional sheet (warp). The filament should be held taut and touching each other to produce total "cover" of the planar area of the sheet and in a typical example the thickness of the sheet of filaments is about 3 millimeters. One way of producing this initial layer or sheet of filaments is to wind a series of tows on to the drum of a conventional warping machine. However, it has been found that a better prepared sheet of filaments can be formed using a special preparation apparatus shown in FIGS. 1, 2 and 3.

Referring first to FIG. 1, the required number of tows 10, each carried by a short flanged drum 12, is mounted end-to-end on a single stationary beam 14. From this beam 14, the filaments are drawn in warp sheet form (indicated at 16) through a needle loom 18, and on to a take-up roller 20. Arrangements for letting off filaments in warp form; drawing them through processing equipment and winding them up on a take-up roller, are well known in the textile industry and therefore require no detailed description here. It should be mentioned however that the take-up roller 20 should have a driven spindle (flanged) to ensure that the necessary tension is applied to the filamentary sheet. The needle loom itself is only very diagrammatically illustrated in FIG. 1.

Between the beam 10 and the needle loom 18, there are two parallel rods 22 and 24, which will be referred to as the spreader rods. Special flanged spreader devices 26 are mounted on the rods 22 and 24 and the arrangements of these devices is such that the tow from a single drum 12 or carton is received between the flanges of a single spreader device, and the spreader devices themselves alternate across the width of the apparatus on the spreader rods 22 and 24, i.e. a first spreader device 26a is on the rod 22, the next spreader device 26b is on the rod 24, the next on the rod 22 and so on.

Essentially, each spreader device 26 comprises a cylinder able to turn on the rod 22 or 24, the periphery of the cylinder being slightly bowed (banana-shaped)— this shaping of the cylinder is exaggerated in FIG. 3 for illustrative purposes. Locking means (not shown) are provided for locking each device 26 in a selected angular relationship to the rod on which it is mounted.

Considering the spreader device 26b this is illustrated with its maximum radius on the top side of the rod 22. It will be observed from FIG. 1, that the sheet of filaments 16 is stretched over and in engagement with the cylinders of the spreader devices 26. Now if a particular tow passes over a device 26 orientated on its rod 22 or 24 as at 26b, the effect will be to cause the filaments to spread laterally (because they tend to slide away from the high centre point towards the flanges of the device 26). The opposite extreme is illustrated at 26a where the smallest radius of the cylinder is at the top, and consequently, there is a tendency for the filaments to slide towards the centre and therefore to be compressed laterally. It will be appreciated that it is possible to adjust the preset orientation of the spreader devices at any angular disposition between the extremes shown at 26a and 26b (including the halfway position at which no lateral spreading or compressing force is applied to the filaments) to present a warp sheet issuing from the spreading arrangement which is as consistent as possible in terms of a lateral density of the filaments and the tension in the filaments.

Instead of the flanged drums 12, the individual tows may be drawn directly from the cartons in which they are normally supplied. In that case, the spreader bars 22 and 24 are positioned directly over the carton containing the tow, and the latter is pulled out of the carton and over the spreader bars. The latter function exactly as previously described with reference to FIG. 2 of the drawings.

The needle loom 18 is conventional in construction and operation. A set of barbed needles 28 is mounted in a vertically reciprocable needle board 30, and those needles are arranged in a plurality of rows each extending across the full effective width of the machine (i.e. the maximum overall width of the filamentary sheet 16). The needle loom has the conventional bed plate 32 and stripper plate 34 both of which are perforated to allow passage of the needles 28 when the needle head 30 descends, and the path of the sheet 16 is between these plates.

In operation, the needles 28 penetrate the filamentary sheet 16 on their descent and are then drawn out of it on their ascent. The barbs of the needles catch some of the filaments and pull those filaments downwardly, so that the caught filaments are severed (because they are held taut) and form generally vertical fibres which tend to bind the filaments of the sheet 16 together. As a result of this needling operation, the sheet 16a issuing from the needle loom and wound on to the take-up spindle 20, has changed from an arrangement of longitudinally extending filaments completely separate from each other into a "fabric" mainly comprising longitudinally extending filaments (and therefore having very good dimensional stability in the longitudinal direction) but with these longitudinally extending filaments sufficiently bound together by the displaced filaments to give the "fabric" some degree of stability in the lateral direction. It will be appreciated that the lateral stability is quite poor, but it is sufficient to allow the "fabric" to be manipulated for subsequent processing, so long as it is not subjected to severe lateral stress.

In a second stage, the fabric taken up on the spindle 20 is subjected to a second needle punching operation on the needle loom 18 (see FIG. 4) by using the spindle 20 at the feeding end of the loom and winding the finished needled fabric onto a take-up spindle 20a. However, in addition to the fabric 16a a web 15 of stapled fibres made of the same polyacrylonitrile as the web 16a is fed from a roller 17 under a pressing roller 19 which causes the stapled fibre web to be laid on the continuous filament fabric 16a. Both the fabric 16a and the web 15 are then fed through the needle loom 18.

Consequently, the fabric 16a and the web 15 are needled together to form a duplex fabric having a foundation of the continuous filament and a "body" of the stapled web. In practice, during this second pass through the needle loom, most of the fibres carried in the downward direction comprise the stapled fibres and the longitudinally (warpwise) filaments are largely undisturbed. This is because the needles first encounter the stapled web and the barbs of the needles fill up with the stapled fibres and hence are less able to break the continuous filaments. This second stage needling therefore produces a duplex fabric 16b, in which the majority of the fibres in the vertical orientation are from the stapled fibre web.

It should be understood that the fabric 16b could be produced on a needle loom with two successive needling heads, the continuous filament only being fed past the first head, and then the stapled fibre web being added before the continuous filament sheet passes under the second needling head.

The next stage in the manufacturing process is illustrated in FIG. 5, and this is a cutting stage. The sheet 16b is placed on the bed of a cutting machine (not shown) equipped with shaped knives for cutting segments 36 and 38 out of the sheet. Such cutting machines are used in garment manufacture or in the manufacture of footwear. The result of the cutting process is to produce a multiplicity of segments of an annulus, six of which can be assembled as shown in FIG. 6, in a side-by-side arrangement, to produce a flat annular-shaped assembly or fabric layer.

The preform which is made by the exemplary method herein described is intended to be used as the basis of a carbon fibre reinforced disc for a brake particularly suitable for aircraft use, and this product requires the annular shape shown in FIG. 6. The annular shape in turn determines the shape of the segments 36 and 38—though it is to be understood that more or less than six such segments could be used and this would alter the dimensions and precise shape of the segments. It is a significant feature of the process that the segments are cut from the needled filament sheet 16b.

One advantage of the segmental structure method will be immediately apparent, in that it is possible to produce the required shape (in this case an annulus) with relatively little wastage of the filamentary sheet. Since the oxydised polyacrylonitrile material is very expensive, this is a great advantage. The actual technique of laying out the segments on the sheet is well understood in the garment and footwear industries. However, there is another advantage to the segmental construction method, which is well illustrated in FIG. 5, in that the segments 36 are cut in such a way that the majority of the filaments extend substantially radially of the eventual annulus (see segment 36a in FIG. 6), whereas the segments 38 are cut so that the majority of the filaments extend substantially chordally of the annulus (see segment 38a in FIG. 6). Clearly the segments 36 will have their greatest dimensional stability in the radial direction, and the segments 38 will have their greatest dimensional stability in the chordal direction.

The waste material after the cutting of the segments can be reprocessed through opening and carding machinery (not shown) to be used in the production of the stapled web 15.

The segments are assembled into the annular shape on a support 40 (see FIGS. 7, 8 and 9) which is made of foamed polyethylene, formed to the same annular shape as that required of the finished preform. The method of assembling the segments on the support 40 will be hereinafter described, but for present purposes it will suffice to say that the segments are laid in the side-by-side arrangement shown in FIG. 6 on the support. The first layer of segments thus laid up on the support may comprise a set of segments 36 with the filaments of all the segments radially disposed, or it may comprise a set of segments 38 with the filaments of all the segments chordally disposed, or it may comprise segments 36 alternating with segments 38.

At that stage, with a simple layer of segments on the support 40, a needle punching operation, using barbed needles as in the needle loom, is carried out on the support and the first layer of segments. The needles displace some of the staple fibres lying predominantly on top of the radially and chordally arranged filaments of the segments 36 and 38, into a generally vertical orientation, again, to a large extent, leaving the continuous tow filaments undisturbed. This has three effects:

(i) it further stabilises the segments themselves;

(ii) it binds the layers of segments together, and (ii) it attaches the needled assembly of segments to the support 40, because as shown in FIGS. 8 and 9, some of the filaments are displaced into the foamed support.

An interesting and not necessarily understood phenomenon is that if the finished product is cut on a horizontal line, all the stapled fibres at first sight appear to have disappeared. This is because in the second and subsequent needling stages, the continuous filaments seem to suffer little or no disturbance (so that the radially and chordally arranged filaments are visible in the cut section) but many of the stapled fibres are orientated in the vertical direction—intermingled with the continuous filaments—by the needling process. Closer examiner shows however that some of the stapled fibres are still in a random arrangement.

It may be found advantageous to lay two layers of segments, one on top of the other, before this first needle punching operation. In that case, it is preferred to arrange segments with one orientation of filaments on top of segments having the alternative filament orientation; but it is also preferred to lay up the second layer so that its radial joints do not coincide with the radial joints of the first layer.

The use of a foamed needle-penetrable support in a needle punching operation is an important feature of the process, because it ensures the stability of the assembly of segments in the required structural shape at a stage in the manufacturing process, when the segments are both relatively fragile and very difficult to manipulate.

A second layer of segments similar to the first layer is then laid on top of the first layer of segments and needle punching operation is repeated, using a small, vertically reciprocable needling head 42 illustrated in FIG. 7. This has the effect of cross-linking the two layers of segments by vertically disposed stapled fibres; further consolidating the first layer of segments; increasing the thickness of the total assembly of segments and further securing the assembly to the support 40. It will be appreciated that the segments of each layer may themselves be formed of two layers of individually cut segments.

Now the segments of the second layer are selected and arranged so that the filaments in the second are differently orientated than those in the first layer—e.g. a segment with chordally arranged filaments is disposed over a segment with radially arranged filaments. However, it is also preferred to arrange that the radial joints of the second layer do not coincide with the radial joints of the first layer. This process of adding layers of segments and needling them continues until the required overall thickness of the preform is arrived at as shown in FIG. 9.

Although all the layers of segments may be made of the duplex material 16b, it is to be understood that some layers may be made only of the continuous filamentary material 16a as it issues from the loom 18 at the first pass could be employed; indeed any combination of layers made from the continuous filament material 16a or the duplex material 16b could be employed.

The depth of stroke of the needles is kept constant during the addition of the layers of segments, but as each layer is added, the stroke of the needles is displaced upwardly approximately the thickness of a layer of segments. In other words, there is superimposed on the vertical reciprocation of the needle head 42 a slow upward translatory motion, so that the extent of the needle stroke is always rising. The result is that all the eventual mass of filamentary material is cross-linked by mainly vertically displaced stapled fibres, but towards the upper end of the range, the needles are not penetrating the support 46. Therefore only the lower layers of segments are themselves cross-linked to the support and the top and bottom layers are not directly cross-linked, although the whole mass is well bound together.

This continuous displacement of the needles is modified towards the end of the process as will be described later with reference to FIGS. 13 to 15 of the drawings.

It has been found that if the included angle of each of the segments is 68° it is possible to arrange a multiple layer of segments one on another without any two radial joints being aligned with each other. It will be appreciated that if the segments subtend 68°, then instead of forming a complete first layer and then laying a second layer on top of it, as has been described above for simplicity, what actually happens is that a larger number of segments together form a helix which is continuously laid up on the support 40, with one convolution lying on the next and the needling operation is carried out in a continuous fashion by turning the support 40 about the vertical axis of the annular shape to bring all parts of the assembly under the needling head 42.

When the structure of filamentary material cross linked by stapled fibres on the support 40 is of adequate thickness and has been sufficiently needle punched, the whole assembly of the support and the preform can be stored and/or transported. It will be appreciated that if the filamentary structure is of relatively low density and/or quite thin, it may be still quite limp, and somewhat difficult to manipulate by itself, but the polyethylene support 40 gives it a good degree of rigidity. However, in many instances, the preform will itself have adequate rigidity to allow it to be manipulated without the polyethylene support.

The filamentary preform is cut off the support 40 prior to carbonisation.

The oxydised preform is then placed in a carbonising oven and at this stage it is only necessary to apply weights to the top of the preform to achieve a controlled fibre volume density. This is because the needle punching has given the preform adequate stability, compacted it and introduced cross-binding by the needled stapled fibres.

The preform is sufficiently rigid to allow it to be placed in a furnace entirely without moulds for the formation of the matrix. After matrix formation in the furnace, the resulting carbon-carbon product (now sufficiently rigid) can then be machined if necessary and provides a disc for use in high duty brakes for vehicles. In fact, it is suitable for use on aircraft undercarriages. It has been found that a disc made by the method of the invention is particularly well adapted to resist applied stresses as applied in braking without delamination or other structural failure. In addition, it will be appreciated that the method is cheaper than prior art methods, because of the saving of material and energy.

Turning now to FIGS. 10, 11 and 12, there is shown a machine which is adapted to carry out the segment assembly and needle punching technique described in general terms previously, with reference to FIGS. 7, 8 and 9.

It has also been found possible to vary the density of the needled assembly by increasing or decreasing the needling action—an increase in needling increasing the bulk density of the product. Because the product is inherently less liable to delamination than similar products made by the known methods, relatively low densities may be used, with consequent saving in material. The machine has a stationary plinth 50, to which there is rigidly attached a stationary drive housing 52. An open topped rotary receptacle 54 in which the segment assembly and needle punching takes place is mounted for rotation about its own vertical axis on top of the drive housing 52. The machine also has a needle punching head 56 slidably mounted upon the plinth 50.

The open topped receptacle 54 is cylindrical and has a closed bottom 56; it is secured on a circular drive plate 58 by screws 60. The drive plate 58 forms part of the driving mechanism of the machine to be hereinafter described, but the receptacle 54 can be removed by unfastening the screws 60, and replaced by an alternative receptacle. A cylindrical core 62 has end plates 64 and 66, and is secured on a core spindle 68 so as to be rigid with that spindle. At its lower end the core spindle 68 has a flange 70 which can be secured by screws 72 to the drive plate 58. By unfastening these screws 72, it is also possible to remove the core 62 from the drive plate 58. It will be appreciated, that since both the receptacle 54 and the core 62 are secured to the drive plate 58, they rotate together with that plate. In use, the core 62 defines the internal diameter of an annular segment assembly, and the peripheral wall of the receptacle 54 defines the outside of the segment assembly.

Mounted within the annular space in the receptacle 54 is an annular false bottom 74. A false bottom lowering member 78 has a cylindrical lower section 77 from which three equi-angularly spaced driving columns 79 project upwardly. The false bottom 74 is secured by screws 76 to the top ends of the driving columns 79. Each of the columns 79 extends through a bearing arrangement 80 in the drive plate 58, so that when the drive plate 58 is rotated, the driving columns 79 rotate with it, and consequently, the false bottom 74 is also rotated with the receptacle 54 and the core 62. Hence, there is provided a rotary receptacle arrangement to contain the assembly of segments as that assembly is being built up and needle punched.

The false bottom is capable of vertical motion with the lowering member 78 (as will be hereinafter described) from a top position illustrated in full lines in FIG. 11, to a lowered position illustrated in chain-dotted lines in FIG. 11. The particular receptacle 54 illustrated in FIGS. 10, 11 and 12, can only be used to produce an annular assembly of specific dimensions. In practice, the machine illustrated can be used to manufacture annular assemblies having a range of dimensions, because it is possible to completely remove the receptacle core and false bottom, and replace these by an alternative receptacle arrangement having different dimensions appropriate to another size of finished needled product.

For the purpose of driving the drive plate 58 (and therefore rotating the receptacle 54), a small variable speed receptacle drive motor 82 is secured to a stationary element within the drive housing 52. The motor shaft is connected directly to a worm shaft 84 in a receptacle drive gearbox 86. The worm shaft 84 meshes with a worm wheel 88 mounted on a primary shaft 90 which is journalled in bearings 92 and 94 carried by stationary parts of the drive housing 52. A driving pinion 96 is keyed on the primary shaft 90, and meshes with a large spur gear 98 keyed on the outside of a main drive spindle 100 which, as is clear from FIG. 12, essentially comprises a cylinder. The main drive spindle 100 is itself journalled in bearings 102 and 104 which are located in stationary elements of the drive housing 52. It will be appreciated therefore, that when the motor 82 is operated, drive is transmitted through the worm gear reduction box and the primary shaft 90, to the spindle 100, which rotates at a relatively low speed. The drive to the spindle 100 is controlled through an electrical control system (not shown) which is set to ensure that the assembly of segments accumulating in the receptacle 54 is rotated at a speed required to produce adequate needle punching of the segments, as those segments pass underneath the needling head 55.

It has already been mentioned that the false bottom 74 is rotated with the receptacle 54, by virtue of the drive transmitted through the bearing arrangements 80 to the driving columns 79. However, the driving arrangement also incorporates a mechanism for raising and lowering the false bottom 74 in accordance with the requirements of the needle punching and assembling operation. To this end, a small variable speed elevation motor 106 is provided within the lower part of the drive housing 52, and the motor shaft is directly connected to a worm shaft 108 of an elevation gearbox 110 secured to stationary parts of the drive housing 52. The worm shaft 108 meshes with a worm wheel 112 keyed onto a screw shaft 114 which is coaxial with the vertical axis about which the receptacle 54 rotates. At its lower end, the screw shaft 114 is journalled in bearings 116 in a stationary part of the drive housing 52. The upper end of the screw shaft 114 is journalled at 118 in a cap 120 which is secured by screws 122 to the top ends of three stationary pillars 124 the bottom ends of which are welded to a stationary part of the drive housing 52. Consequently, the pillars 124 provide mountings for the top cap 120 the purpose of which is to provide a top journal mounting for the screw shaft 114.

The main portion 126 of the screw shaft 114 is screw threaded, and an elevation nut 128 engages with this screw threaded main portion 126. The nut 128 is secured by screws 130 in a slider 132. The slider 132 is generally cylindrical, with an inturned flange at its lower end, and the pillars 124 extend through bearings 134 in this inturned bottom end. It will be recalled that the pillars 124 are fixed at their lower ends to a stationary part of the drive housing 52, and hence do not rotate. The bearing arrangement 134 prevents rotation of the slider 132, which in turn prevents rotation of the nut 128. However, the bearing arrangement 134 permits the slider 132 to slide vertically on the pillars 124. Hence, as the screwed shaft 114 is rotated, the nut 128, being prevented from rotating, moves longitudinally of the screwed shaft (i.e. it moves vertically). The slider 132 is provided with top and bottom bearing flanges 136 and 138, and an annular drive member 140 is located between these flanges 136 and 138. The cylindrical lower section 77 of the lowering member 78 is secured by pins 142 to the annular drive member 140. By virtue of this connection, the annular drive member 140 has to rotate with the lowering member 78 and therefore with the receptacle 54, but bearings between the annular drive member 140 on the one hand and the slide member 132 with its flanges 136 and 138 on the other hand ensure that the member 140 is able to rotate despite the fact that the slider 132 is non-rotatable. The end flanges 136 and 138 are the means whereby the axial motion of the nut 128 is transmitted to the lowering member 78. It will be appreciated that this axial motion of the member 78 with its columns 79 produces the elevation and lowering of the false bottom 74 within the rotary receptacle 54.

The mounting for the needling head 55 comprises a long slide 150 having dovetail cross section slide bearings (similar to those used on machine tools) engaging in a stationary mounting 152 on the plinth 50. Thus, the slide 150 is able to move in a longitudinal direction indicated by the arrow A, that is radially with respect to the rotational axis of the open topped receptacle 54. A traversing screw 154 is journalled in an extension of the mounting 152, and is controllable through a handwheel 156. The split nut 158 is secured by screws 160 to the slide 152, and this nut engages on the screw 154. Rotation of the handwheel 156 therefore causes sliding motion of the slide 150 in or out with respect to the vertical axis of the receptacle 54 according to the direction of rotation of the handwheel. (As an alternative to the handwheel 156, or in addition thereto, there may be power driven means for rotating the spindle 154 to produce the radial motion of the slide 150.)

The slide 150 carries a stop rod 162 on which are adjustably mounted stops 164 and 166 adapted to cooperate respectively with limit-switches 168 and 170 to indicate the inner and outer extremities of motion. As illustrated in FIG. 10, the slide 150 is shown at the inner end of a preselected movement, with the stop 164 engaging with the limit switch 168. A signal initiated by the limit switch 168 will indicate to the setter, that the needling head 55 has been correctly located with respect to the receptacle 54. It will be appreciated, that when an alternative receptacle 54 is fitted to the drive plate 58, it is necessary to adjust the position of the stops 164 and 166 accordingly. The needling head 55 has a variable speed driving motor 172, on the motor shaft extension of which is a driving pulley 176 of a toothed belt drive 178. The driven wheel 180 of the belt drive is keyed onto the driving shaft 182 of the needling head 55.

It is unnecessary to describe the mechanism of the needling head 55 in detail, because essentially, this mechanism is the same as that of a dabber brush as used on a Noble comb in the combing industry. Suffice it to say for present purposes, that there is a vertically reciprocable needle carrier 184 which is operated by the drive from the motor 172. various sizes of needle board 186 can be fitted to the lower end of the needle carrier 184, each of these needle boards being similar to the needle boards used on a conventional needle loom, excepting that they are much smaller in area than those used on a needle loom. Each needle board 186 is provided with the usual barbed needles (not shown) as used in a needle loom for penetrating a fibrous mass. For any particular application, the needles projecting from the needle board 186 have to be so arranged that they are all able to fit in the annular space between the core 62 and the wall of the receptacle 54 in order to carry out the needling operation. The electrical control system is so arranged that the needle board 186 always comes to rest in the raised position where the needles are clear of the top of the receptacle 54.

It will be appreciated, that with the needling head 55 in the innermost position as indicated in FIG. 10, it is possible to carry out a needle punching operation on filamentary segments or assemblies of such segments located on the false bottom 74 within the receptacle 54. Moreover, as the receptacle 54 is rotated under the stationary needling head 55, the complete annular assembly is subjected to the needling action. One of the important features of the present invention is the carrying out of a needle punching operation on filamentary material, where the material traverses a recirculating path (namely the rotation about the vertical axis of the receptacle 54) under a stationary needling head. This is in contradistinction to the ordinary needle loom arrangement, such as that shown diagrammatically in FIG.

1, where a continuous length of filamentary material moves in rectilinear fashion under a needling head.

It will be noted that there is no stripper board as used in conventional needling looms, although if it is found necessary to use such a stripper board, it can be mounted from the stationary parts of the needling head 55.

Provision is also made in the machine for automatic control of the elevation and lowering of the false bottom 74 within the receptacle 54. For this purpose, a speed reduction gearbox 190 is attached to the underside of the worm gearbox 110, and a train of speed reduction gears 192 transmits driving motion from a driving pinion 194 mounted on the bottom end of the screw shaft 114 to a pinion 196 meshing with a rack 198 attached to a control rod 200; this control rod 200 is mounted for axial sliding motion and is driven through the gearbox 190 whenever the screw shaft 114 is rotated. The gearing is so arranged that the stop rod moves to the right as seen in FIG. 12 when the false bottom 74 is being lowered. Closely adjacent to the stop rod 200 is a switch mounting rod 202 which is fixed to the casing of the gearbox 190. Consequently, the switch mounting rod 202 has no motion, and therefore there is relative motion between the stop rod 200 and the switch mounting rod 202.

A pair of dogs 204 and 206 is attached to the of the stop rod 200, and these dogs are adapted to cooperate with a series of switches 208, 210, 212, 214 and 216 adjustably mounted on the switch mounting rod 202. The switch 210 is adapted to be tripped by the dog 204 whenever the screw 114 has been rotated to bring the false bottom 74 into the lowest operative position and is referred to as the "DOWN" switch. The switch 216 is adapted to be tripped by the dog 206, should the switch 210 fail to operate to protect the machine parts. Closure of the switch 210 which is referred to as the "DOWN" switch should terminate the electrical supply to the elevating motor 108 to prevent further downward motion of the false bottom 74, but if for some reason the false bottom continues to descend, closure of the switch 216 by the dog 206 will cut off the electrical supply. The switch 216 is therefore referred to as the "OVERRUN DOWN" switch.

The switch 212 is adapted to be operated by the dog 206 when the false bottom is elevated above the starting position, to a discharge position where it projects above the top of the receptacle 54. The switch 212 is referred to as the "UP" switch.

The switch 214 is adapted to be tripped by the dog 206, when the false bottom is in the starting position illustrated in FIG. 11 and therefore this switch is referred to as the "START" switch. When this switch is tripped, it is adapted to cause the operation of the driving motor 82 for rotating the receptacle 54, and also for operating the elevation motor 106 for commencing the lowering of the false bottom 74.

Finally, the switch 208 (which is referred to as the "UP OVERRUN" switch) is adapted to be tripped by the dog 204 if the false bottom should be elevated to a position above the normal up or discharge position.

When the machine illustrated in FIGS. 10, 11 and 12 is to be operated, the correct size of receptacle 54 is bolted to the drive plate 58, and the appropriate size of needle board 186 is fitted to the needling head 55. As has already been mentioned, the machine is equipped with electrical control circuitry which receives signals from the switches 168 and 170 operated by the in and out feed of the needling head 55, and from the switches 208, 210, 212, 214, and 216. The control circuit is set to bring about a sequence of operation as follows: In the starting position, the false bottom 74 is located (as shown in FIG. 10) about ten millimeters below the top lip of the receptacle 54. This location is suitable for receiving the polyethylene support 40, and the support is placed on the false bottom, where it is located by the wall of the receptacle 54.

The slide 150 is then actuated by turning the handle 156, to move the needling head 55 into the operative in position, as illustrated in FIG. 10. When the needling head arrives at the in position, the switch 168 is closed, and this permits electrical power to be supplied to the two variable speed motors 82 and 106 of the machine. The first layer of segments 36 and 38 is then laid manually on the support 40, with their edges in abutting arrangement as illustrated in FIGS. 6 and 7. (As has been mentioned, this first layer may in practice be constituted by two layers laid one on top of the other.) When this first layer of segments has been laid on the support 40 in the receptacle 54, the driving motor 82 is operated, and the receptacle 54 begins to rotate. At the same time, the motor 172 driving the needling head 55 is operated, and consequently, the needling head begins to carry out a needle punching operation on the filamentary segments located beneath it in the receptacle 54. The needles carried by the needle board 186 penetrate the portion of the first layer of segments which lies under the needling head, carrying those stapled fibres which are caught by the barbs of the needles vertically downwards from the plane of the segments 36 and 38 into the needle penetrable support 40. See also FIG. 1. Although the needles themselves withdraw from the support 40, and from the filamentary segments 36 and 38, the stapled fibres which have been displaced into this vertical position remain embedded in the support 40.

As the receptacle 54 rotates, it carries the first layer of segments under the needling position, and after a single rotation, all the first layer has been subjected to a needle punching operation, and it is secured to the support 40 by those stapled fibres which have become embedded in the support.

At the end of a single rotation of the receptacle 54, a limit switch (not shown) is tripped and this causes actuation of the elevation motor 106 for a predetermined period of time. As a result, the elevating mechanism is operated to lower the false bottom 74, through a distance which is approximately equal to the thickness of a single layer of the needled filamentary segments.

Further segments are then fed one at a time onto the first layer of segments as the receptacle 54 continues to rotate. Since the rotation will be relatively slow, it is possible to carry out this feeding of the segments by hand. The feed position may be located immediately in advance of the position at which the needling head 55 operates. As these further segments pass under the needling head 55, they too are needle punched, and this has the effect of cross linking the segments to the segments of the first layer, and of course, further binding the assembly of segments to the needle penetrable support 40.

It will be appreciated that as each succeeding layer of segments passes under the needling head 55, it becomes cross linked by the vertically displaced stapled fibres to the layers underneath it, and since the support 40 is descending in stepwise fashion, once every revolution of the receptacle, the penetration of the needles into the support 40 is progressively reduced. Eventually when the thickness of the assembly of segments on the false bottom exceeds the depth of penetration of the needles into the assembly of segments, there is no further cross linking of the stapled fibres into the support 40. This position is shown in FIG. 14.

The operation continues until the thickness of the filamentary material which has been needled to produce the required annular shape is approaching that which is required of the finished product. At that stage, the dog 204 will actuate the DOWN switch 210 terminating the supply of current to the driving motors 82, 106 and 172. Consequently, all the operations of the machine are brought to a halt. At that stage, the needled layers of fabric have a thickness T shown in FIG. 15. A layer of segments 250 made entirely from stapled fibrous web (i.e. without continuous filaments) is then laid on top of the needled layers which form the thickness T. The machine is then operated through two complete revolutions but with the elevation motor 106 switched off so that there is no lowering of the stack of needled layers. This causes the majority of the fibres in the layer 250 to be carried into the needled stack.

Two further layers 252 and 254 both comprising only stapled fibres are added and after each one has been added, the machine is operated through two complete revolutions, but there is no lowering of the stack. Hence, an additional thickness of material t comprising only stapled fibres is added, though the actual thickness will be reduced somewhat by the needling process and the three layers 250, 252 and 254 are bonded to the stack by the needling process. Therefore the outer portion of the preform is subjected to a differential needling action because there are six rotations after the stack ceases to descend. Before the preform can be removed from the receptacle 54, the hand wheel 156 has to be turned to retract the needling head 55 from the operative position, to a retracted position. When the switch 170 is operated by the arrival of the needling head at the retracted position, the elevation motor 106 is then operated in the direction opposite to that which caused lowering of the false bottom 74, but at a higher speed, to produce rapid upward motion of the false bottom. This motion continues until the dog 206 operates the UP switch 212, at which point the power supply to the elevation motor 106 is terminated and the false bottom is arrested in the UP position, where it projects above the lip of the receptacle 54. It is then possible to lift the preform together with the needle penetrable support 40 as a unit off the thus elevated false bottom 74. As has been previously mentioned, the support 40 is useful in subsequent manipulation of the assembly, but it is possible to cut the needled assembly off the support 40 when required.

If desired, when the preform has been removed from the support it may be turned over; the preform replaced in the mould and the steps of adding layers similar to the layers 250, 252 and 254 repeated on what was the underside of the stack.

To restart the machine, the operative presses a control button (not shown) which operates the elevation motor 106, to lower the false bottom 74 into the START position. This completes the full cycle of operations of the machine.

It will be appreciated that the needle punching operation carried out in the machine illustrated in FIGS. 10, 11 and 12 results in a degree of compacting of the filamentary segments such as is normally obtained by a needle punching operation. This is useful in the provision of a well bonded together filamentary product. This is useful not only in the provision of a preform which can be placed in a matrix forming furnace without the necessity for clamping, because it also helps to ensure that there is no delamination of the eventual disc, under applied stress. Moreover, it will be appreciated that by suitable control of the machine, it is possible to vary the fibre density, of the preform, by adjusting the speed of rotation of the receptacle 54 relatively to the speed of operation of the needle punching head and/or by adjusting the rate of descent of the support 74.

It should also be mentioned, that experiments have shown that a preform made in accordance with the invention, will have much greater strength than preforms made by known techniques. Consequently, it is possible to effect large savings in material costs, because the density of the preform can be substantially reduced compared with the preforms made by the known techniques. For example, it has been found that a preform formed in accordance with the invention and having a fibre volume of 15% is stronger than the present commercially available preform, which had a fibre volume of approximately 35%. It is expected therefore to be able to obtain satisfactory results, with a fibre volume of between 15% and 24%.

We claim:

1. A method of manufacturing a shaped fibrous fabric structure from multiple layers of fibrous material comprising:

a) providing a stack of generally planar layers of fibrous material, one layer built-up on top of another, said stack defining an upwardly facing surface; and b) needling a part only of the upwardly facing surface of the stack at one particular time during the build up of the stack to interconnect the layers of fibrous material with fibers extending across adjacent layers, with each layer of fibrous material being comprised of a plurality of generally planar pieces, each piece being added separately to the stack, and causing relative movement between needles effecting the needling and the stack such that the pieces of each layer are needled into the stack.

2. A method according to claim 1 comprising needling the complete upwardly facing surface of each layer over a period of time.

3. A method according to claim 1 comprising effecting the needling of the upwardly facing surface of a layer and simultaneously adding a piece to that layer.

4. A method according to claim 3 comprising continuously performing the needling of the upwardly facing surface of the layers throughout the manufacture of the fibrous structure.

5. A method as claimed in claim 1 comprising causing relative movement between the needles and the stack by causing relative rotational movement.

6. A method as claimed in claim 5 comprising adding pieces that are segmental in shape.

7. A method as claimed in claim 5 comprising adding the pieces such that the layers comprise part of a helix.

* * * * *